United States Patent [19]

Lezzi et al.

[11] Patent Number: 5,357,002
[45] Date of Patent: Oct. 18, 1994

[54] POLYMER CONTAINING CHELATING GROUPS, PROCESS FOR PREPARING IT AND ITS USE IN WATER PURIFICATION

[75] Inventors: Alessandro Lezzi, Milan; Arnaldo Roggero, San Donato Milanese; Sandra Cobianco, Coazze, all of Italy

[73] Assignee: Eni Chem Synthesis S.p.A., Palermo, Italy

[21] Appl. No.: 992,716

[22] Filed: Dec. 18, 1992

[30] Foreign Application Priority Data

Dec. 19, 1991 [IT] Italy ............................ MI91A003417
Dec. 1, 1992 [IT] Italy ............................ MI92A002750

[51] Int. Cl.$^5$ ........................... C08F 8/34; C08F 8/32; C08F 8/38; C08F 8/26
[52] U.S. Cl. ........................ 525/332.2; 525/328.8; 525/328.9; 525/332.3; 525/332.4; 525/332.7; 525/333.4; 525/333.5; 525/333.6; 525/384; 525/385
[58] Field of Search ............... 525/332.2, 333.5, 333.6, 525/385, 384, 332.7

[56] References Cited

U.S. PATENT DOCUMENTS

| | | |
|---|---|---|
| 3,847,841 | 11/1974 | Motani et al. |
| 3,883,490 | 5/1975 | Fujimoto et al. |
| 3,892,688 | 7/1975 | Motani et al. |
| 3,892,689 | 7/1975 | Motani et al. |
| 3,923,748 | 12/1975 | Hutt et al. |
| 4,160,675 | 7/1979 | Pannekeet ............... 127/46 |
| 4,173,693 | 11/1979 | Au et al. ............... 525/329 |
| 4,908,405 | 3/1990 | Bayer ................... 525/61 |
| 5,042,990 | 8/1991 | Bonaccorsi et al. ............. 44/280 |

FOREIGN PATENT DOCUMENTS

| | | |
|---|---|---|
| 0431370 | 6/1991 | European Pat. Off. |
| 2312233 | 3/1973 | Fed. Rep. of Germany |
| 2740241 | 3/1978 | Fed. Rep. of Germany |
| 7318317 | 5/1973 | France |
| 2250771 | 11/1974 | France |
| 1164492 | 6/1989 | Japan |
| 1201303 | 8/1989 | Japan |
| 1570425 | 8/1977 | United Kingdom |

OTHER PUBLICATIONS

J. L. Wardell, "The Chemistry of the Thiol Group" Part 1, 186 (1974) Wiley (New York).
Cramana Hammond "Organic Chemistry", 216–217, (1960) McGraw-Hill (New York).
Feigenbaum, Harold N., "Removing Heavy Metals in Textile", Apr. 1977, pp. 32–34.
Gardiner, William C. et al; "Mercury Removed From Waste Effluent via Ion Exchange"; Aug. 1971; pp. 57–59.
Benes, Milan J.; "Chemical Transformations of Polymers"; Jul. 1974; pp. 67–75.
John Wiley & Sons; "The Chemistry of the thiol group'-'Part 1; 1974; pp. 162–269.
John Wiley & Sons; "The Chemistry of cyanates and their thio derivatives" Part 2; 1977; pp. 1002–1023.

*Primary Examiner*—Fred Zitomer
*Attorney, Agent, or Firm*—Rogers & Wells

[57] ABSTRACT

Water insoluble polymers containing hydrophilic pendant moieties ending with a chelating group are disclosed. The polymers are useful in the purification of water polluted by heavy metals such as mercury and lead. The polymers have the general formula P—(—(—O—R)$_n$—(NH—Q)$_p$—F)$_m$ where P is a polymeric matrix capable of reacting with a polyalkylene glycol or an alkylene oxide having such a structure and molecular weight as to be insoluble in water; R is either —CH$_2$CH$_2$— or mixtures of —CH$_2$CH$_2$— and —CH$_2$CH(CH$_3$)—, with the molar ratio of both units in the mixture being at least 3:1; n is 3 to 50; m is a numeral such that the % by weight of all of the —(—(—O—R—)$_n$(NH—Q)$_p$—F hydrophilic chains is higher than 1% by weight of the total weight of (I); Q is a C$_2$-C$_6$ difunctional aliphatic or aromatic hydrocarbon radical; p is 0 or 1; F is a chelating group selected from dithiocarbamate and methyl-thiourea when p is 1, or from thiol and isothiouronium when p is 0.

8 Claims, No Drawings

POLYMER CONTAINING CHELATING GROUPS, PROCESS FOR PREPARING IT AND ITS USE IN WATER PURIFICATION

The present invention relates to a process for removing and/or recovering heavy metals (in particular Hg, Cd, Pb, Cu, Ag) from industrial waste waters and waters destined to human consumption.

More particularly, the present invention relates to a water insoluble polymer containing hydrophilic pendant moieties ending with a chelating groups, to the process for preparing it, and to the use of said polymer in water purification.

The increasing pollution of waste waters and of groundwaters requires suitable removal strategies which are not affected by the many limitations typical of the processes used up to now.

The more widely used methodologies result to be the physical-chemical methods, as well as ion exchange based methods. The selection of the treatment method takes into account the characteristics of waste waters, the required purification efficiencies, the problems connected with waste materials disposition, and the investment and operating costs.

Among physical-chemical methods, the most widely used one is the precipitation of these metals as sulfides, phosphates (Crandall, C. J.; Rodenberg, J. R. Eng. Bull. Purdue Univ., Eng. Ext. Ser. 1974, 145, Pt.1, 194–206), hydroxides and carbonates, followed by coprecipitation, coagulation, reduction. For most heavy metals, very widely used results to be the precipitation as sulfide, by means of addition of sodium sulfide. The precipitation can be carried out within a wide range of pH values, but this technique results to be efficient only if a large excess of reactant is used, with serious problems arising as regards the toxicity of effluent streams. In any cases, the effectiveness of that method (the concentration of residual $Hg^{++}$ is of approximately 50 ppb) is not such as to comply with the values provided for by the Law.

In an analogous way, Sulfex process (Feigenbaum, H. N. Ind. Wastes (Chicago) 1977, Vol. 23(2), pages 32–4), which uses iron-(II) sulfide instead of sodium sulfide, retains the advantage of high efficiencies of mercury removal (from 21 ppm down to 25 ppb), without generating the noxious sulfide excess, but suffers from the drawback of generating extremely large amounts of sludges, which, after dehydration post-treatments, have to be stabilized and suitably disposed of in controlled landfills, with high disposition costs.

Recently, processes of removal of physical type have been developed and applied, which are based on the use of ion exchangers and of solid adsorbent phases.

Among cationic exchange resins, the resin disclosed in German Offenlegungschrift 2,740,241, constituted by a styrene-divinylbenzene copolymer modified with thiol groups, results to be a very effective one. This system uses two resin beds, which reduce the concentration of residual mercury in the effluent stream down to 5 ppb.

The process described by Gardiner, W. C., Nunoz, F., in Chem. Eng. 1971, Vol. 78(19), pages 57–59, uses two anionic exchange resins and acts on mercury only, converting it into chlorocomplexes, and reducing its concentration down to 2–5 ppb, but not on cadmium and lead. Furthermore, according to such a process, the regeneration of only one resin is provided for, with the other resin having to be replaced after each application.

The adsorption on previously modified, activated charcoal proved to be a very effective method in order to remove heavy metals, but it is still not widely diffused, owing to the high costs thereof, and the impossibility of adsorbent regeneration.

To date, the technology which entails the use of chelating polymers, seems to be the most advantageous one, because it provides for a process route which is considerably simplified as compared to physical-chemical methods, with the advantage that it neither produces waste materials, nor generates secondary pollutants. Unfortunately, a limitative factor is the low system reactivity, due to the limited interaction between the polluted aqueous solution and the hydrophobic polymer. The consequence is an insufficiently slow kinetics and inadequate diffusion at practical level, as also set forth by Milan J. Benes et al., in "Die Angewandte Makromolekulare Chemie", Vol. 44 (1975), pages 67–75.

The present Applicant found now, and this is the subject-matter of the present invention, a system which overcomes the disadvantages and limitations of the prior art, as expounded hereinabove.

Said system is based on the use of a resin capable of complexing metal ions, which resin is constituted by a hydrophobic backbone which renders it insoluble in aqueous media, functionalized with hydrophilic pendant moieties, prevailingly constituted by polyoxyethylene chains which, in their turn, support chelating groups. The importance of ethylene oxide pendant moieties which, owing to their hydrophilic character tend to extend towards the water phase, is that they allow the resin to operate in homogeneous phase at polymer-water interface, and consequently increase the reactivity of the chelating groups, which act as selective chelating agents for the heavy metal ions.

Similar polymers, however devoid of the necessary thiol groups and hence not useable for the treatment of waste liquors, are disclosed in U.S. Pat. No. 5,042,990 wherein polyalkyleneglycol ethers supported on polymer are claimed, which are useful as phase transfer catalysts.

Also U.S. Pat. No. 5,042,990 discloses copolymers with "comb-like" structure, in this case water soluble polymers, which are constituted by a hydrophobic backbone bearing hydrophilic poly(ethylene oxide) chains, useful as dispersants for coal water concentrated mixtures (CWM).

These hydrophilic pendant moieties extending towards water stabilize the aqueous dispersions, preventing coal particles from coming into contact with each other.

In accordance therewith, the present invention relates to a water insoluble compound having the general formula (I)

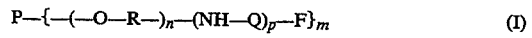

wherein

P— is a polymeric matrix having such a structure and molecular weight as to be insoluble in water;

R— is either $-CH_2CH_2-$, or mixtures of $-CH_2CH_2-$ and $-CH_2CH(CH_3)-$, with, in the latter case, the molar ratio of both units to each other being of at least 3:1;

n is a numeral comprised within the range of from 3 to 50;

m is such a numeral that the % by weight of all of the hydrophilic chains —(—O—R—)$_n$—(NH—Q)$_p$—F results to be higher than 1% of the total weight of (I).

Q is a difunctional, either aliphatic or aromatic, hydrocarbon radical of from 2 to 6 carbon atoms;

p is zero or one;

F is a chelating group selected from dithiocarbamate and methyl-thiourea when "p" is 1, or from thiol and isothiouronium when "p" is 0.

If the functional group "F" of the compound of general formula (I) is —SH, the compound of general formula (I) also comprises a Low Level, at maximum 5%, of product crosslinked by means of disulfide bridges. This crosslinking is suitable, because it enhances the water insolubility of the product (I), at the cost of an extremely small decrease in the level of chelating groups.

The polymeric matrix P— should have such a molecular weight and structure, as to be insoluble in water. Should the polymeric matrix be not crosslinked, the molecular weight should be higher than approximately 10,000. In any case, the polymer should furthermore contain groups capable of reacting either directly, or after a preliminary reaction step, to be performed subsequently, with an alkylene oxide, in particular ethylene oxide, or with a polyglycol.

Therefore, suitable for the intended purpose are water insoluble polymers or copolymers containing —CH$_2$—X functions (wherein X can be chloro, bromo, iodo, tosylate, acetate, bisulfate radicals), which are subsequently reacted with ethylene glycol and/or propylene glycol oligomers under basic catalysis conditions, as disclosed, e.g., in U.S. Pat. No. 4,173,693, or with ethylene oxide or its mixtures with propylene oxide. A typical example of a hydrophobic polymer is chloromethylated styrene divinylbenzene resin containing at least 0.05 meq/g of —CH$_2$Cl groups.

Also those water insoluble (co)polymers which, after a preliminary step of metallation with an alkyl-metal, preferably butyl-lithium, react with an epoxide, in particular ethylene oxide, are suitable as well for the purpose according to the invention. Poly(4-alkylstyrene), aromatic polyethers [in particular, poly(2,6-dimethyl-4-phenylene oxide)], polysulfones, styrene-divinylbenzene resins belong to this category.

Finally, suitable for the intended purpose are those water insoluble (co)polymers which contain polar functional groups, with at least one hydrogen atom reactive with ethylene oxide or propylene oxide, such as —COOH, —COOR hydrolysable into —COOH, —NHR(H), —OH, —CONHR(H). Polyamides, polyalcohols (preferably their relevant copolymers, owing to reasons of water solubility), (co)polyacids, (co)polyesters, (co)polyamides, (co)polyamines, belong to this group.

According to a preferred embodiment of the present invention, the polymeric matrix —P— is a chloromethylated styrene-divinylbenzene resin (with a —CH$_2$Cl content of more than 0.05 meq/g).

According to another preferred embodiment, the polymeric matrix —P— is a poly(4-methylstyrene) or a poly(2,6-dimethyl-4-phenylene oxide), which, after metallation, can react with ethylene oxide or ethylene oxide/propylene oxide mixtures.

The numeral "n" in general formula (I) represents the number of alkylene ether units —OR— which, by following each other, constitute one of the hydrophilic chains of the polymer with general formula (I). In other words, "n" is a parameter which indicates the length of the hydrophilic chain which supports the chelating group.

The number of alkylene ether units "n" is comprised within the range of from 3 to 50; less than 3 units do not supply the necessary hydrophilicity, and more than 50 units are unsuitable, because the compound of general formula (I) might become a too hydrophilic one, with consequent incipient solubilization in water. It should finally be reminded that "n" may also represent the average number of alkylene ether units, a very likely possibility in the case of reaction of —P— polymer with ethylene oxide or propylene oxide.

The alkylene ether can be an ethylene oxide —OCH$_2$CH$_2$—, or a mixture of ethylene oxide and propylene oxide [—OCH$_2$CH(CH$_3$)—]. In the latter case, in order to obtain the necessary hydrophilic characters, the molar ratio of poly(ethylene oxide) to poly(propylene oxide) should be of at least 3:1. However, it is preferable that the alkylene ether is totally constituted by ethylene oxide units. Still more preferably, —R— is —CH$_2$CH$_2$— and "n" is comprised within the range of from 4 to 40.

In the general formula (I), "m" is the average number of hydrophilic chains present in the polymeric matrix, i.e., in other terms, the number of sites of —P— polymeric matrix which have reacted, either directly or indirectly, with polyglycols or alkylene oxides. The above said hydrophilic chains are constituted by "n" units —OR— following each other, an optional —NHQ— group and the chelating group —F.

By knowing "m" and "n", one may learn the content of hydrophilic portion in the polymer of general formula (I). The value of "m", i.e., the number of hydrophilic chains, should be such that the % by weight of all hydrophilic moieties

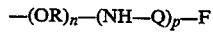

is higher than 1%, and preferably is comprised within the range of from 10 to 50%, based on the total weight of the polymer of general formula (I).

From the resulting functionalized polymer —P— with hydrophilic chains, the compound of general formula (I) is obtained by converting the terminal hydroxy group into a chelating group. The latter is selected from thiol group —SH; dithiocarbamate —NHCS$_2$—Y+ (with the counter-ion Y+ being selected from alkali metals, alkaline-earth metals or ammonium); methylthiourea —NH—CS—NHMe and isothiouronium —S—C(NH$_2$)$_2$+X− (wherein X− is selected from bromide, chloride and tosylate).

The conversion of the end hydroxy group into one of said chelating moieties can be carried out according to techniques known from the prior apt (in particular, see Patai, The Chemistry of the Thiol Group, part 1, J. Whiley and Sons, 1974, pages 163–267; and The Chemistry of Cyanates and Their Thio Derivatives, Part 2, J. Whiley and Sons, 1977, pages 1003–1023).

As regards the transformation of end —OH group into chelating moieties selected from —SH and —S—C(NH$_2$)+X− (wherein X− is selected from bromide, chloride and tosylate), the above said moieties can be introduced by simple replacement of end —OH group, with, in that way, the compound of general formula (I) in which p is zero.

In particular, as regards the introduction of the chelating group —SH, the terminal —OH group is converted into a good leaving group (—X), preferably chloro, bromo or tosylate radicals.

The subsequent reaction of the latter with thiourea yields the isothiouronium salt, which is subsequently converted into a thiol group (either by reaction with an amine in an organic medium, or by basic hydrolysis), according to the following reaction scheme (R), in which "p" is zero:

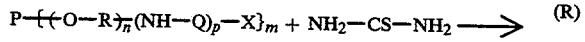
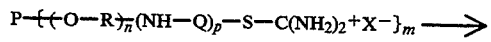
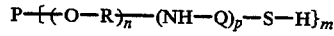

The yield of this reaction is nearly quantitative, and consequently all terminal —OH groups are converted into —SH groups, yielding the compound of general formula (I) in which —F is —SH and "p" is zero.

As regards the isothiouronium chelating group —S—C(NH₂)₂⁺X⁻ (wherein X— is selected from bromide, chloride and tosylate), also said group can be introduced by simple replacement of the terminal —OH group.

According to an advantageous embodiment, one might proceed as follows: the end —OH group, converted into a good leaving group (—X) selected from chloro, bromo or tosylate radicals, is reacted with thiourea, yielding the isothiouronium salt, which is subsequently converted into a thiol group, according to the following reaction scheme (S), in which "p" is zero:

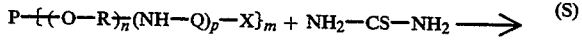
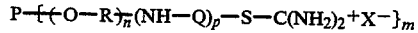

In that way, the compound of general formula (I) is obtained, in which "p" is zero and —F is isothiouronium group.

If the terminal —OH group has to be converted into methylthiourea or dithiocarbamate, into the hydrophilic chains the —(NH—Q)$_p$— group must be entered, in which "p" is 1. For that purpose, the end —OH groups of the hydrophilic pendant moieties are transformed into good leaving groups, preferably chloro, bromo, tosylate radicals. The latter are subsequently reacted with a compound of general formula H₂N—Q—NH₂ (in which —Q— is a difunctional, aliphatic or aromatic hydrocarbon radical of from 2 to 6 carbon atoms), i.e., with a primary, aliphatic or aromatic diamine of from 2 to 6 carbon atoms, Useful for the intended purpose are ethylenediamine, propylene diamine, butylenediamine, pentylenediamine, hexamethylenediamine, 2- or 3- or 4-phenylenediamine. In the preferred embodiment, the diamine H₂N—Q—NH₂ is ethylenediamine; —Q— consequently is —CH₂—CH₂—.

The primary amino groups introduced in said way are finally reacted with carbon disulfide in the presence of bases, preferably with sodium hydroxide, thereby introducing dithiocarbamate groups according to the reaction scheme (T):

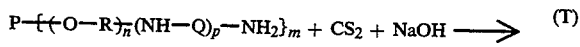
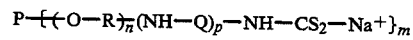

In that way the product of general formula (I) is obtained, in which p is 1, —Q— is —CH₂CH₂—, —F is dithiocarbamate group —NH—CS₂—.

As an alternative, the primary amino groups are reacted with methyl thiocyanate in order to yield methyl thiourea, according to the reaction scheme (U):

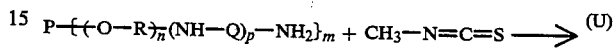
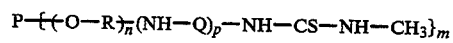

In that way, the product of general formula I is obtained in which p is 1, —Q— is —CH₂CH₂—, F is methylthiourea group —NH—CS—NH—CH₃.

Also the yields of these reactions S,T,U are nearly quantitative, and consequently all terminal —OH groups are converted into dithiocarbamate, methylthiourea, or isothiouronium moieties, yielding the compounds of general formula (I), Such polymers of general formula (I), highly insoluble in water, can be used in order to reduce the level of heavy metals in aqueous waste liquors polluted by heavy metal ions, particularly silver, copper, cadmium, lead, mercury ions.

So, for example, a polymer of general formula (I) which —F is —SH, deriving from poly(2,6-dimethyl-4-phenylene oxide), metallated with butyl-lithium, ethoxylated to such a level as to have an average value of "n" equal to 4, suspended, at the concentration of 1% by weight, in an aqueous solution containing 17.8 ppm of Hg⁺⁺ ions, is capable of reducing the concentration of Hg⁺⁺ ions to less than 5 ppb after 7 hours of treatment.

Said treatment can be carried out batchwise or continuously. When the batchwise operating mode is selected, the polymers of general formula (I) are suspended in the polluted aqueous solution, kept suitably stirred.

At the end of the above said treatment, the polymers of general formula (I), owing to their total water insolubility, can be recovered by filtration or simply by decantation, without requiring any particular system of membrane filtration, which, on the contrary, have to be used for water soluble polymers.

The resins recovered in that way can be regenerated according to techniques known from the prior art, for example by reaction with concentrated hydrochloric acid (6N), when the chelating function is methylthiourea or thiol group; by reaction with an aqueous thiourea solution, when the chelating function is dithiocarbamate or isothiouronium group.

The so regenerated resin can be used again in subsequent demetallation treatments.

Besides reasons of cheapness and efficiency, the selection of the chelating group —F can be carried out as a function of the pH value of the waste liquors to be trated. For example, for aqueous media with a pH value of more than 4, chelating groups selected from dithiocarbamate, methylthiourea and isothiouronium are preferred.

The following experimental examples are reported in order to better illustrate the present invention.

EXAMPLE 1

Preparation of the compound of general formula (I) in which P is a polymeric matrix deriving from poly(p-methyl styrene) (PMS), R is —$CH_2CH_2$—, "n" is about 13, —F is —SH, "p" is zero and the % content of hydrophilic portion is approximately 47.4%.

1A) Functionalition of (PMS) (Synthesis of PMS—$CH_2CH_2$—OH)

10 g of (PMS) (obtained by anionic polymerization and having molecular weight Mw=20,000) and 600 ml of anhydrous cyclohexane (17.2 ppm) were charged to a flask of 1 liter of capacity equipped with mechanical stirring means and condenser. The polymeric solution was then thoroughly desiccated, after a preliminary azeotropic distillation of approximately 240 ml of solvent.

The suitable amount of metallating agent, constituted by 6 ml of a 2.5N cyclohexanic solution of n-butyllithium and 2.25 ml of tetramethylethylenediamine (TMEDA) was added to the polymeric solution, at room temperature.

Heating such a solution to 60° C. and keeping it at said temperature for 2 hours causes the formation of a red heterogeneous mixture constituted by the metallated polymer. Through this mixture, ethylene oxide gas was slowly bubbled with vigorous stirring and at room temperature, until the red color of the reaction mixture had totally disappeared (0.66 g). After a further hour of stirring, to the mixture methanol was added and the polymer was isolated and purified by means of repeated precipitations from methanol.

The reaction product (PMS—$CH_2$—$CH_2$—OH)—which, by referring to the general formula (I) is referred to in the following as $P(1)-\{-OH\}_m$—was obtained with quantitative yield and with a functionalization rate of 17 mol %.

1B) Ethoxylation of $P(1)-\{-OH\}_m$

The reaction was carried out in an autoclave of 50 ml of capacity equipped with magnetic stirring means and provided with fittings for ethylene oxide and nitrogen inlet, thermometer well and safety valve. 6 g of $P(1)-\{-OH\}_m$, potassium hydroxide (86%) as a finely ground solid (1-1.2 parts by weight per 100 parts by weight of functionalized polymer) and 10 ml of N-methylpyrrolidone were charged to said autoclave.

The autoclave, purged with nitrogen, was heated up to approximately 130° C.; during 60 minutes, 4.8 g of ethylene oxide (approximately 13 ethyleneoxy units per each hydroxy group of the functionalized polymer) were charged. During this time period, an increase in temperature of about 10°-15° C. was observed. At the end of the addition, the autoclave was kept standing at 150° C. for 60 minutes, then it was cooled down to room temperature, the excess of pressure was vented, the ethoxylated polymer, i.e.,

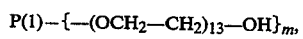
$P(1)-\{-(OCH_2-CH_2)_{13}-OH\}_m$, was isolated and purified by means of repeated precipitations from methanol, The yield of the ethoxylation reaction resulted to be quantitative.

1C) Synthesis of $P(1)-\{-(OCH_2CH_2)_{13}-TS\}_m$, wherein "TS" stands for the tosyl Group 3.63 g of tosyl chloride and 150 ml of dichloromethane were charged to a flask of 500 ml of capacity equipped with mechanical stirring means, condenser and addition funnel, then, under stirring and at room temperature, 5 g of $P(1)-\{-(OCH_2CH_2)_{13}-OH\}_m$, dissolved in a small amount of dichloromethane and 3,07 ml of anhydrous pyridine, were added duping a 30 minutes time. After the addition, the reaction mixture was kept under dichloromethane refluxing conditions for 5 hours.

The tosylated product $P(1)-\{-(OCH_2CH_2)_{13}-TS\}_m$, was recovered by means of sequential precipitations from methanol (yield of 90.2%).

1D) Synthesis of $P(1)-\{-(OCH_2CH_2)_{13}-SH\}_m$ 5 g of $P(1)-\{-(OCH_2CH_2)_{13}-TS\}_m$, 200 ml of dioxane and 0.35 g of thiourea were charged to a flask of 500 ml of capacity equipped with mechanical stirring means and condenser. The reaction mixture was kept under dioxane refluxing conditions for 5 hours, then 0.44 ml of piperidine was added and the resulting mixture was caused to reflux for a further 1 hour time. The polymer, containing partially crosslinked thiol groups and 0.50 meq of —SH pep each polymer gramme, was recovered by precipitation from methanol (yield of 88%).

EXAMPLE 2

Comparison Example

Preparation of the compound of general formula (I) in which P is a polymeric matrix deriving from poly(p-methyl styrene), "n" is zero, "p" is zero and —F is —SH.

By means of the same procedure as disclosed in Example 1C, the tosylate is prepared by using the $P(1)-\{OH\}_m$ compound prepared in Example 1A (5 grammes), 6.44 g of tosyl chloride, 150 ml of dioxane and 0.50 ml of pyridine.

5 grammes of the resulting tosylate is caused to react, according to as disclosed in 1D, with 0.44 g of thiourea, 200 ml of dioxane and 0.50 ml of piperidine, in that way a polymer $P(1)-\{-SH\}_m$ being obtained which bears thiol groups directly linked to the polymeric matrix. The resulting polymer contains 1.32 meq of —SH groups per each polymer gramme.

EXAMPLE 3

Preparation of the compound of general formula (I), in which —P— is a polymeric matrix deriving from PPO, i.e., poly(2,6-dimethyl-4-phenylene oxide), R is —$CH_2CH_2$—, "n" is about 7, "p" is zero, —F is —SH, the % by weight of the hydrophilic portion is approximately of 44.6%.

3A) Functionalization of PPO, i.e. synthesis of PPO—$CH_2CH_2$—OH ($P(2)-\{-OH\}_m$ hereinunder)

The reaction equipment used for the metallation reaction is constituted by a tightly sealed tubular reactor of 1 liter of capacity, equipped with stirring means, nitrogen inlet and reactants addition fitting, pressure gauges and temperature indicators. To said reactor, 7.2 grammes of PPO ($M_w$=50,000) and 300 ml of anhydrous tetrahydrofuran are charged.

The polymer is dissolved by heating the reaction mixture up to 50° C., then the resulting solution is cooled down to room temperature, and 12 ml of 2.5N n-butyllithium is added.

The metallation lasts 1 hour at room temperature, then 3 g of ethylene oxide is added, and is caused to react for 30 minutes. The reaction product is isolated and purified by means of repeated precipitations from methanol.

The yield is quantitative and the functionalization rate is of 29.7 mol %.

3B) Ethoxylation of P(2)–{—OH}$_m$

By means of the same procedure as disclosed in Example 1B, 14.5 g of P(2)–{—OH}$_m$, the preparation of which is disclosed in 3A, is reacted in 20 ml of N-methylpyrrolidone with 8.5 grammes of ethylene oxide (approximately 6 ethylene oxide units per each hydroxy group contained in P(2)–{—OH}$_m$).

The resulting P(2)–{—OCH$_2$CH$_2$)$_6$—OH}$_m$ is recovered by means of sequential precipitations from petroleum ether.

The ethoxylation yield is quantitative.

3C) Synthesis of P(2)–{—OCH$_2$CH$_2$)$_6$—TS}$_m$

By following the same procedure as disclosed in 1C, 11.06 g of tosyl chloride is caused to react with 10 g of P(2)–{—OCH$_2$CH$_2$)$_6$—OH}$_m$ in 350 ml of dichloromethane and 9.36 ml of anhydrous pyridine (yield of 90%).

3D) Synthesis of P(2)–{—OCH$_2$CH$_2$)$_6$—SH}$_m$

As disclosed in Example 1D, 6 g of P(2)–{—OCH$_2$CH$_2$)$_6$—TS}$_m$ and 0.7 g of thiourea are reacted in 150 ml of dioxane and 0.7 ml of piperidine (yield 87%).

The resulting product contains 0.94 meq of —SH per polymer gramme.

EXAMPLE 4

Comparison Example

Preparation of the compound of general formula (I), in which P is a polymeric matrix deriving from poly(2,6-dimethyl-4-phenylene oxide), "n" is zero and "p" is zero, —F is —SH.

By following the same procedure as disclosed in Example 1C, the tosylate derivative P(2)–{—TS}$_m$ is prepared by starting from 10 g of P—(2)–{—OH}$_m$ (prepared according to as disclosed in Example 3A), 21.2 g of tosyl chloride and 10 g of P—(2)–{—OH}$_m$ in 250 ml of dichloromethane and 18 ml of anhydrous pyridine (yield 80%).

4B) Synthesis of P—(2)–{—SH}$_m$

By following the same procedure as disclosed in Example 1D, P—(2)–{—SH}$_m$ is prepared by starting from 10 g of P—(2)–{—TS}$_m$ and 1.22 g of thiourea in 400 ml of dioxane and 1.22 ml of piperidine. The resulting P—(2)–{—SH}$_m$ contains 1.63 milliequivalents of —SH groups per polymer gramme.

EXAMPLE 5

The products containing thiol groups prepared according to as disclosed in the above Examples 1–4 are suspended (in a concentration of 10 g/liter) in aqueous solutions of mercury nitrate containing mercury-(II) ions at pH 2.22.

The suspension is kept stirred at room temperature for 7 hours, and then is filtered through a 0.45 micron Millipore filter. The concentration of mercury-(II) ions remained in solution is determined by means of atomic absorption.

An intermediate sample is collected after 2 hours of stirring. The results are reported in following Table 1.

TABLE 1

| Polymer (Example) | Hg$^{2+}$ content | | |
|---|---|---|---|
| | Initial (ppm) | after 2 hours (ppm) | after 7 hours (ppm) |
| 1 | 38.2 | 5.2 | 0.4 |
| 2 (comp.) | 17.8 | 3.5 | 1.5 |
| 3 | 17.8 | 0.013 | <0.005 |
| 4 (comp.) | 17.8 | 0.11 | 0.025 |

EXAMPLE 6

Preparation of the compound of general formula wherein the polymeric matrix —P— is a chloromethylated (1.6 Cl meq/g) (2%) styrene-divinylbenzene resin, R is —CH$_2$CH$_2$—, "n" is 4, "p" is 0, —F is —SH and the % by weight of the hydrophilic portion is 8.4%.

6A) Synthesis of PSR—ET(4)OH, i.e., of P(3)–{OCH$_2$CH$_2$)$_4$—OH}$_m$

To a mixture constituted by 2 g of styrene-divinylbenzene resin (PSR), 2.8 g (0.05 mol) of solid, finely ground potassium hydroxide, 0.64 g (3.2 mmol of —OH) of tetraethylene glycol (m.w.=200) and 40 ml of tetrahydrofuran (THF); 1.09 g (3.2 mmol) of tetrabutylammonium hydrogensulfate (TBAHS) was added during 8 hours, at THF refluxing temperature (65° C.).

The mixture was then kept under THF refluxing conditions for 20 hours, then was cooled, diluted with water, filtered and subsequently washed with a saturated ammonium chloride solution, water, acetone and dichloromethane.

For the complete removal of tetraethylene glycol, P(3)–{—(OCH$_2$CH$_2$)$_4$—OH}$_m$ was kept under THF refluxing conditions for a further 2 hours, then was filtered and dried in a vacuum oven for 4 hours at 80° C.

Yield: 2.20 g of P(3)–{—(OCH$_2$CH$_2$)$_4$—OH}$_m$.

6B) Synthesis of P(3)–{—(OCH$_2$CH$_2$)$_4$—Br}$_m$ 2 g of P(3)–{—(OCH$_2$CH$_2$)$_4$—OH}$_m$ was suspended in 50 ml of dichloromethane and the resulting suspension was kept stirred for 2 hours. Then, 0.3 ml of PBr$_3$ was added dropwise, then the reaction mixture was refluxed for 30 hours with stirring.

P(3)–{—(OCH$_2$CH$_2$)$_4$—Br}$_m$ was subsequently filtered, repeatedly washed with water, acetone and dichloromethane and was dried in a vacuum oven, for 4 hours at 80° C.

Yield: 1.80 g of P(3)–{—(OCH$_2$CH$_2$)$_4$—Br}$_m$—

6C) Synthesis of P(3)–{—(OCH$_2$CH$_2$)$_4$—SH}$_m$ 1 g of P(3)–{—(OCH$_2$CH$_2$)$_4$—Br}$_m$ was suspended in 40 ml of a 1:1 dioxane:ethanol mixture and the suspension was kept stirred for 2 hours. Then, 0.30 g of thiourea was added and the mixture was kept refluxing for 30 hours, Then, 0.40 ml of piperidine was added to the reaction mixture, which was then refluxed for a further 7 hours.

P(3)–{–(OCH$_2$CH$_2$)$_4$–SH}$_m$ was then filtered and repeatedly washed with water, acetone and dichloromethane, and then was dried in a vacuum oven, for 4 hours at 80° C.

Yield: 0.83 g of P(3)–{–(OCH$_2$CH$_2$)$_4$–SH}$_m$, having a sulfur content of 0.52 mmol of S/g.

EXAMPLE 7

Preparation of the compound of general formula (I) wherein the polymeric matrix —P— is a chloromethylated (1.6 Cl meq/g) (2%) styrene-divinyl-benzene resin (PSR) "n" is 9, "p" is 0, R is —CH$_2$CH$_2$—, —F is —SH and the % by weight of the hydrophilic portion is about 15.5%.

7A) Synthesis of P(3)–{OCH$_2$CH$_2$)$_9$–OH}$_m$

By following the same procedure as disclosed in Example 6B, 2 g of PSR is reacted with 1.28 g of polyethylene glycol (m.w.=400).

Yield: 2.36 g of P(3)–{–(OCH$_2$CH$_2$)$_9$–OH}$_m$.

7B) Synthesis of (P(3)–{–(OCH$_2$CH$_2$$_9$–Br}$_m$

By following the same procedure as disclosed in Example 6B, to 2 g of P(3)–{–(OCH$_2$CH$_2$)$_9$–OH}$_m$, 0.13 ml of PBr$_3$ was added.

Yield: 2.18 g of P(3)–{–(OCH$_2$CH$_2$)$_9$–Br}$_m$.

7C) Synthesis of P(3)–{–(OCH$_2$CH$_2$)$_9$–SH}$_m$

By following the same procedure as disclosed in Example 6C, 1 g of P(3)–{–(OCH$_2$CH$_2$)$_9$–Br}$_m$ is reacted with 0.27 g of thiourea and then with 0.36 ml of piperidine.

Yield: 0.89 g of P(3)–{–(OCH$_2$CH$_2$)$_9$–SH}$_m$, having a sulfur content of 0.6 mmol of S/g.

EXAMPLE 8

Preparation of the compound of general formula (I) wherein the polymeric matrix —P— is a chloromethylated (1.6 Cl meq/g) (2%) styrene-divinyl-benzene resin, R is —CH$_2$CH$_2$—, "n" is 13, "p" is 0, —F is —SH and the % by weight of the hydrophilic portion is 21%.

8A) Synthesis of P(3)–{OCH$_2$CH$_2$)$_{13}$–OH}$_m$

By following the same procedure as disclosed in Example 6A, 2 g of PSR is reacted with 1.93 g of polyethylene glycol (m.w.=600).

Yield: 2.48 g of P(3)–{–(OCH$_2$CH$_2$)$_{13}$–OH}$_m$.

8B) Synthesis of P(3)–{–(OCH$_2$CH$_2$)$_{13}$–Br}$_m$

By following the same procedure as disclosed in Example 6B, to 2 g of P(3)–{–(OCH$_2$CH$_2$)$_{13}$–OH}$_m$, 0.11 ml of PBr$_3$ was added.

Yield: 1.8 g.

8C) Synthesis of P(3)–{–(OCH$_2$CH$_2$)$_{13}$–SH}$_m$

By following the same procedure as disclosed in Example 6C, 1 g of P(3)–{–(OCH$_2$CH$_2$)$_{13}$–Br}$_m$ is reacted with 0.26 g of thiourea and then with 0.34 ml of piperidine.

Yield: 0.92 g of P(3)–{–(OCH$_2$CH$_2$)$_{13}$–SH}$_m$, having a sulfur content of 0.56 mmol of S/g.

EXAMPLE 9

Comparison Example

Preparation of the compound of general formula (I) wherein the polymeric matrix —P— is a chloromethylated (1.6 Cl meq/g) (2%) styrene-divinyl-benzene resin (PSR), "n" is 0, "p" is 0, —F is —SH.

By following the same procedure as disclosed in Example 6C, to 2 g of PSR 0.50 g of thiourea was added.

The resulting isothiouronium salts were then hydrolysed with 0.63 ml of piperidine.

Yield: 1.85 g of P(3)–{–SH}$_m$, having a sulfur content of 0.92 mmol of S/g.

EXAMPLE 10

The products containing thiol groups prepared according to as disclosed in the above Examples 6–9 are suspended (in a concentration of 10 g/liter) in aqueous solutions of mercury nitrate containing mercury-(II) ions at pH 2.2.

The suspension is kept stirred at room temperature for 7 hours, and then is filtered through a 0.45 micron Millipore filter. The concentration of mercury-(II) ions remained in solution is determined by means of atomic absorption.

An intermediate sample is collected after 2 hours of stirring. The results are reported in following Table 2.

TABLE 2

| Polymer (Example) | Hg$^{2+}$ content | | |
|---|---|---|---|
| | Initial (ppm) | after 2 hours (ppm) | after 7 hours (ppm) |
| 6 | 18.8 | 0.10 | 0.045 |
| 7 | 18.8 | 0.022 | <0.005 |
| 8 | 18.8 | 0.027 | <0.005 |
| 9 (comp.) | 18.8 | 8.30 | 4.3 |

EXAMPLE 11

Preparation of a compound of general formula (I) in which the polymeric matrix —P— is a chloromethylated (1.6 Cl meq/g of P) (2%) styrene-divinylbenzene resin (PSR), —R— is —CH$_2$CH$_2$—, "n" is about 13, —Q— is —CH$_2$CH$_2$—, "p" is 1, —F is dithiocarbamate group and the % by weight of the hydrophilic portion is about 24%.

11A) Synthesis of P(3)–{–(OCH$_2$CH$_2$)$_{13}$–NHCH$_2$CH$_2$NH$_2$}$_m$

In a flask of 100 ml, equipped with mechanical stirring means and condenser, 3.5 g of P(3)–{–(OCH$_2$CH$_2$)$_{13}$–Br}$_m$ obtained according to as disclosed in Example 8B was suspended in 50 ml of dioxane. The mixture, to which 0.87 ml of ethylene diamine was added, was refluxed in dioxane for 24 hours.

The resulting P(3)–{–(OCH$_2$CH$_2$)$_{13}$–NH CH$_2$CH$_2$NH$_2$}$_m$ was subsequently recovered by filtering, was repeatedly washed with a saturated solution of NaCl until ethylene diamine was no Longer present in the filtrate (disappearance of the blue colour in the reaction with ninhydrin), water and methanol, and was dried in a vacuum oven at 50° C. 3.2 g of P(3)–{–(OCH$_2$CH$_2$)$_{13}$–NH CH$_2$CH$_2$NH$_2$}$_m$ was obtained.

11B) Synthesis of
P(3)—{—(OCH$_2$CH$_2$)$_{13}$—(NH—Q)$_p$—NHCS$_2$Na}$_m$,
(in which —Q— is —CH$_2$CH$_2$—, "p" is 1).

In a flask of 100 ml equipped with mechanical stirring means, a condenser and an additional funnel, 2 g of P(3)—{—(OCH$_2$CH$_2$)$_{13}$—(NH—Q)$_p$—NH$_2$}$_m$ was kept suspended for 1 hour in a mixture of 0.5N NaOH:-dioxane (30 ml:20 ml).

By means of an addition funnel, 0.30 ml of CS$_2$ in ethanol was added, and the mixture was kept 24 hours at 30° C. The excess of CS$_2$ was removed from the mixture, by keeping the latter heated at 50° C. for 4 hours.

The resulting product

P(3)—{—(OCH$_2$CH$_2$)$_{13}$—(NH—Q)$_p$—NHCS$_2$-Na}$_m$ was recovered by filtering, was repeatedly washed with water and methanol, and was dried over in a vacuum oven for 4 hours at 50° C.; 2.0 g of P(3)—{—(OCH$_2$CH$_2$)$_{13}$—(NH—Q)$_p$—NHCS$_2$-Na}$_m$ was obtained.

EXAMPLE 12

Comparison Example

Preparation of the compound of general formula (I) wherein the polymeric matrix —P— is a chloromethylated (1.6 Cl meq/g of P) (2%) styrene-divinyl-benzene resin (PSR), "n" is 0, "p" is 1, —Q— is —CH$_2$CH$_2$— and —F is dithiocarbamate group.

By following the same procedure as disclosed in Example 11A, to 2 g of PSR suspended in 50 ml of dioxane, 2.2 ml of ethylenediamine was added. 1.85 g of P(3)—{—NHCH$_2$CH$_2$NH$_2$}$_m$ was obtained.

One g of the latter product was reacted, according to as disclosed in Example 11B, with 4 ml of CS$_2$ in ethanol.

Yield: 0.85 g of P(3)—{—NHCH$_2$CH$_2$—NHCS$_2$-Na}$_m$.

EXAMPLE 13

Preparation of a compound of general formula (I) in which the polymeric matrix —P— is a chloromethylated (1.6 Cl meq/g of P) (2%) styrene-divinylbenzene resin (PSR), —R— is —CH$_2$CH$_2$—, "p" is 1, —Q— is —CH$_2$CH$_2$—, "n" is 13, —F is methylthiourea group and the % by weight of the hydrophilic portion is about 24%.

In a flask of 100 ml, equipped with mechanical stirring means, bubble condenser and addition funnel, 2 g of P(3)—{—(OCH$_2$CH$_2$)$_{13}$—NHCH$_2$CH$_2$NH$_2$}$_m$, prepared according to as disclosed in Example 11A, was suspended in 50 ml of a water: dioxane mixture (in the ratio of 30 ml:20 ml). By means of the addition funnel, 4.8 ml of methyl thiocyanate in methanol was added.

The mixture was kept at 50° C. for 24 hours, then P(3)—{—(OCH$_2$CH$_2$)$_{13}$—NHCH$_2$CH$_2$TU}$_m$ (wherein "TU" means methylthiourea) was recovered by filtering, was repeatedly washed with water and methanol, and was dried under vacuum for 24 hours.

Yield: 1,85 g.

EXAMPLE 14

Preparation of a compound of general formula (I) in which the polymeric matrix —P— is a chloromethylated (1.6 Cl meq/g of P) (2%) styrene-divinylbenzene resin (PSR), —R— is —CH$_2$CH$_2$—, "n" is 13, "p" is 0, —F is the isothiouronium group and the % by weight of the hydrophilic portion is about 20%.

In a flask of 100 ml, equipped with mechanical stirring means and condenser, 2 g of P(3)—{—(OCH$_2$CH$_2$)$_{13}$—Br}$_m$, obtained as disclosed in Example 8B, was suspended in 50 ml of dioxane.

Then, 0.26 g of thiourea was added, and the resulting mixture was kept under dioxane refluxing conditions for 24 hours.

The resulting

P(3)—{—(OCH$_2$CH$_2$)$_{13}$—SC(NH$_2$)$_2$$^+$X$^-$}$_m$ was subsequently recovered by filtering, was repeatedly washed with water, and was dried in a vacuum oven for 4 hours at 50° C.

Yield: 1.95 g.

EXAMPLE 15

The products containing dithiocarbamate groups prepared according to as disclosed in the above Examples 11-12 are suspended (in a concentration of 10 g/liter) in aqueous solutions of mercury nitrate containing mercury-(II) ions at pH 4.5.

The suspension is kept stirred at room temperature for 7 hours, and then is filtered through a 0.45 micron Millipore filter. The concentration of mercury-(II) ions remained in solution is determined by means of atomic absorption.

An intermediate sample is collected after 2 hours of stirring. The results are reported in following Table 3.

TABLE 3

| Polymer (Example) | Hg$^{2+}$ content | | |
|---|---|---|---|
| | Initial (ppm) | after 2 hours (ppm) | after 7 hours (ppm) |
| 11 | 18.1 | 1.9 | <0.005 |
| 12 (comp.) | 18.1 | 8.8 | 8.3 |

EXAMPLE 16

The products containing dithiocarbamate groups prepared according to as disclosed in the above Examples 11-12 are suspended (in a concentration of 10 g/liter) in aqueous solutions of lead nitrate containing lead-(II) ions at pH 5.5.

The suspension is kept stirred at room temperature for 7 hours, and then is filtered through a 0.45 micron Millipore filter. The concentration of lead-(II) ions remained in solution is determined by means of atomic absorption.

An intermediate sample is collected after 2 hours of stirring. The results are reported in following Table 4.

TABLE 4

| Polymer (Example) | Pb$^{2+}$ content | | |
|---|---|---|---|
| | Initial (ppm) | after 2 hours (ppm) | after 7 hours (ppm) |
| 11 | 19.5 | 0.10 | <0.05 |

TABLE 4-continued

| Polymer (Example) | Pb²⁺ content | | |
|---|---|---|---|
| | Initial (ppm) | after 2 hours (ppm) | after 7 hours (ppm) |
| 12 (comp.) | 19.5 | 16.9 | 16.2 |

The data reported in Tables 1-4 demonstrate the enormously high effectiveness of the polymers of the present invention at removing mercury and lead ions from polluted waste liquors. The above said tables also demonstrate the superiority of the above said polymers over the analogous polymers not containing hydrophilic pendant side moieties.

We claim:

1. Water insoluble polymer having the general formula (I)

$$P-(-(-O-R-)_n-(NH-Q)_p-F)_m \quad (I)$$

wherein

P is a water insoluble polymer matrix formed by condensing functional groups on the polymer with a polyethylene glycol or an alkylene oxide;

R is $-CH_2CH_2-$ or mixtures of $-CH_2CH_2-$ and $-CH_2CH(CH_3)-$, with the molar ratio of the units in the mixture being at least 3:1;

n is 3 to 50;

m is a numeral such that the % by weight of all of the $(-O-R-)_n(NH-Q)_p-F$ hydrophilic chains is higher than 1% by weight of total weight of (I);

Q is a difunctional aliphatic or aromatic hydrocarbon radical of from 2 to 6 carbon atoms;

p is 0 or 1;

F is a chelating group selected from the group consisting of dithiocarbamate and methyl-thiourea when p is 1 or from thiol and isothiouronium when p is 0.

2. Polymer according to claim 1, wherein P is prepared from a chloromethylated styrene-divinylbenzene resin.

3. Polymer according to claim 1, wherein P is a poly(4-methyl styrene).

4. Polymer according to claim 1, wherein P is a poly(2,6-dimethyl-4-phenylene oxide).

5. Polymer according to claim 1, in which $-R-$ is $-CH_2CH_2-$.

6. Polymer according to claim 5, in which "n" is comprised within the range of from 3 to 50.

7. Polymer according to claim 6, in which "n" is comprised within the range of from 4 to 40.

8. Polymer according to claim 1, in which "m" is such a numeral that the content, as % by weight, of all of the hydrophilic chains $-(-O-R-)_n-(NH-Q)_p-F$ results to be comprised within the range of from 10 to 50% of the total weight of the polymer of general formula (I).

* * * * *